Feb. 5, 1946.  B. O. AUSTIN  2,393,951
REGULATOR
Filed Jan. 12, 1944
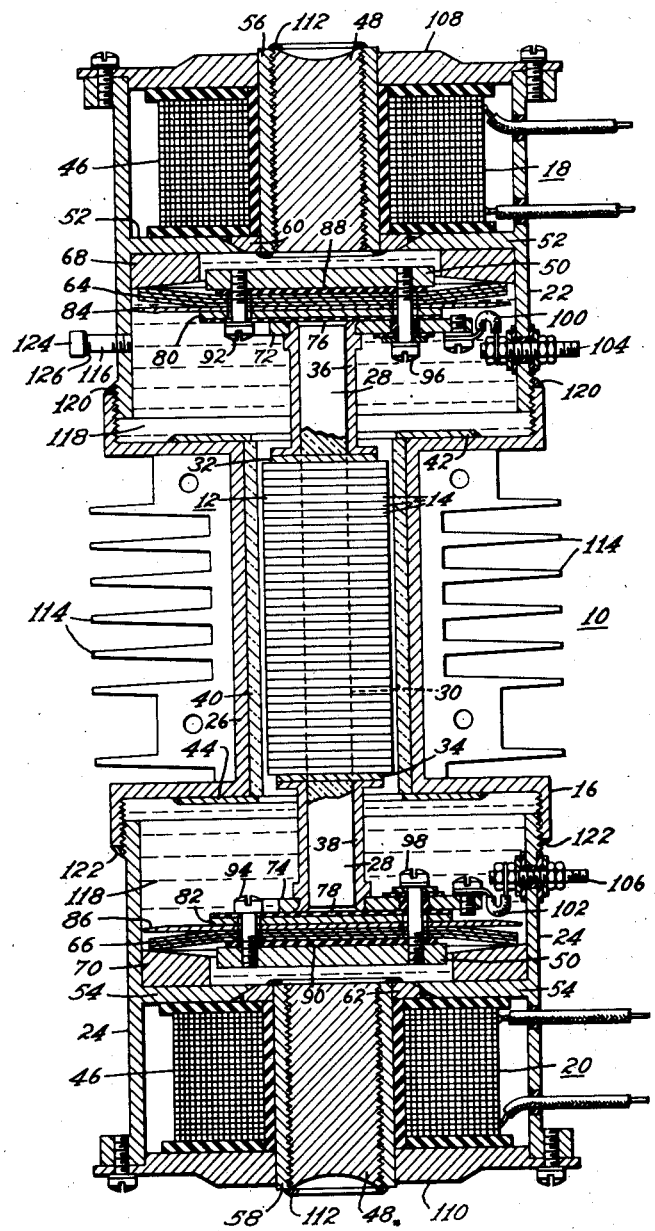
WITNESSES:
Edward Michaels
INVENTOR
Bascum O. Austin.
BY
James N. Ely
ATTORNEY Patented Feb. 5, 1946

2,393,951

UNITED STATES PATENT OFFICE 2,393,951

REGULATOR

Bascum O. Austin, Lima, Ohio, assignor to Westinghouse Electric Corporation, East Pittsburgh, Pa., a corporation of Pennsylvania Application January 12, 1944, Serial No. 517,916

11 Claims. (Cl. 201—51)

This invention relates to electrical apparatus and, particularly, regulators of the pile type.

An object of this invention is the provision of a pile regulator having a floating pile sensitive to predetermined conditions of operation.

Another object of this invention is to provide a pile regulator having opposed actuating mechanisms disposed to maintain a pile therebetween in floating relation for applying pressure thereto in response to predetermined conditions.

Other objects of this invention will become apparent from the following description, when taken in conjunction with the accompanying drawing, the single figure of which is a view in elevation, and, partly in section, of a regulator embodying the teachings of this invention.

Referring to the drawing, this invention is illustrated by reference to a regulator 10 shown therein. The regulator 10 is of the pile type, having a stack 12 of aligned disks 14 of high resistance material such as carbon or the like mounted in a sectionalized housing or casing 16 and disposed to be operated by oppositely disposed electromagnets 18 and 20. The casing 16 is formed of a plurality of sections, two end sections 22 and 24 being connected by an intermediate constricted section 26 within which is mounted the pile or stack 12.

A stack 12 of disks 14 is assembled in operative relation on a shaft or rod 28 of insulating material such as a ceramic rod, the rod 28 extending through openings 30 positioned centrally in each of the disks 14 for maintaining the disks in aligned relation. Pressure plates 32 and 34 are disposed at opposite ends of the stack, being carried by sleeves 36 and 38, respectively, of conducting material disposed about the ends of the rod 28 for movement relative thereto. As illustrated, the stack 12 is insulated from the constricted section 26 of the case, a tube 40 of porcelain or the like being disposed within the section 26 in spaced relation to the stack, and being maintained in position by end rings 42 and 44 positioned at the ends of the tube 40 as by welding them to the case.

The stack 12 is maintained in a floating relation within the case 16 by the armature assembly of the opposed electromagnets 18 and 20. Each of the electromagnets 18 and 20 in the embodiment illustrated is identical, comprising a winding 46, a core member 48 and an armature member 50. The winding 46 of electromagnets 18 and 20 is disposed to seat against the outer surface of partitions 52 and 54, respectively, of the end sections 22 and 24, while the core members 48 are adjustably carried in threaded engagement in sleeves 56 and 58 which are welded or brazed to brass rings 60 and 62, respectively, carried in alignment with and welded to the inner periphery of the partitions 52 and 54, respectively, to provide sealed joints therewith.

In order to provide for applying pressure to the stack 12 to maintain it in floating relation within the case, spring members 64 and 66 are disposed to be secured to the sleeves 36 and 38, respectively, to bias the pressure plates 32 and 34 toward each other. The spring members 64 and 66 illustrated are leaf springs and may be of star-shape or may be circular disks, the ends or outer peripheries of which are bent to seat against ring members 68 and 70, respectively. Ring members 68 and 70 are of stainless steel and are disposed to seat against the outer walls of sections 22 and 24, respectively, and their respective partitions 52 and 54. Ring members 68 and 70 are each provided with a sloping surface for receiving the bent ends of the spring members 64 and 66, respectively, the purpose of the sloping surface being explained more fully hereinafter.

In order to provide for the making of electrical connections to the opposite ends of the stack 12 and to secure the spring members 64 and 66 to the sleeves 36 and 38, respectively, rings 72 and 74 of conducting material are secured to an end of each of the sleeves 36 and 38, respectively, in any suitable manner as by means of a pressed fit. In the assembly shown, a plurality of elements are secured and carried by each of the conducting ring members 72 and 74. Adjacent a surface of the ring members 72 and 74, sheets of insulating material 76 and 78, respectively, are disposed on the other side of which stiffening members 80 and 82, respectively, are placed. Diaphragms 84 and 86 associated with and seating against a face of each of the spring members 64 and 66, respectively, are next disposed against the respective stiffening members 80 and 82, other stiffening members 88 and 90, respectively, being positioned against the other side of the respective spring members 64 and 66. To complete the movable spring assembly, the armature members 50 of electromagnets 18 and 20 are positioned against the stiffening or reenforcing members 88 and 90, respectively, the armature members being preferably in the form of disks of a size to fit within the ring members 68 and 70. The assembled elements described, and consisting of the armature, spring members, diaphragm, stiffening members and insulating sheet associated with each of the sleeves 36 and 38, are held as an integral unit by the screws 92 and 94, respectively, and are secured to the respective conductive rings 72 and 74 by screws 96 and 98, respectively, the latter being suitably insulated from the conducting rings.

As illustrated, each of the conducting rings 72 and 74 is provided with a projection or lug to which one end of conductors 100 and 102, respectively, is connected, the other end of the conductor being secured to conducting bolts 104 and 106, respectively, which extend through the side walls of the end sections 22 and 24, the conducting bolts being suitably insulated therefrom to provide leakproof joints therewith.

When mounted in this manner, the stack 12 is carried in floating relation within the casing 16, the bias of the spring members 64 and 66 being sufficient to maintain the stack in operative position, the flexible spring members 64 and 66 comprising the only support for the movable elements of the assembly.

In order to maintain the windings 46 of the electromagnets 18 and 20 in position within the casing, end plates 108 and 110, respectively, are secured to the ends of the sections 22 and 24, the end plates 108 and 110 fitting tightly against the sleeves 56 and 58, respectively. In assembling the electromagnets 18 and 20, the core members 48 are threadedly adjusted within the sleeves 56 and 58 to adjust the air gap between the armature members 50 of the respective electromagnets 18 and 20. When the core members 48 are properly adjusted, the outer ends of the core members 48 are sealed to the sleeves 56 and 58 by brazing, as shown at 112. This, together with the brazing or welding of the sleeves 56 and 58 with the brass rings 60 and 62, respectively, to the partitions 52 and 54 of the end sections 22 and 24, constitutes an effective sealing of the ends of the casing 16.

In adjusting the position of the core members 48, it is to be noted that a required balance between the magnetic pole and the force of the spring members 64 and 66 over an operating range of the regulator is effected, it being noted that, as the armature member is attracted toward its core member, the magnetic pull increases. This increase in the magnetic pull is offset by the bias of the spring members 64 and 66 seated against the ring members 68 and 70, respectively, it being noted that with the ends of the spring members seating against the sloped surface of the ring members that the effective arm length of the spring members changes as the armature members of the assembly move towards their associated core members.

In order to effectively aid in dissipating any heat that may be generated in the stack 12 of disks 14, a plurality of radiating fins 114 are disposed about the constricted section 26 of the casing, the fins 114 preferably formed of aluminum or the like and being formed on a sleeve which fits about the constricted area. The fin assembly may be formed in two half-sections which, when placed about the constriction section 26, may be bolted together to form a continuous radiating assembly about the constricted section 26.

As illustrated, the end section 22 is provided with a vent 116 which is utilized for the admission of a fluid insulating medium 118 into the casing 16. When the elements of the regulator are assembled, as described hereinbefore, the end sections 22 and 24 are sealed to the intermediate constricted section as at 120 and 122, by brazing or suitably welding the joints to effectively seal the movable elements of the regulator. When thus sealed, the housing or casing 16 is preferably evacuated, suitable vacuum equipment (not shown) being attached to the vent 116 for accomplishing this purpose, and, when evacuated, the thermally conducting electrically insulating fluid medium 118 is admitted to the housing. The fluid medium 118 may be either gaseous or liquid, the main requirement being that the medium utilized be inert to the material such as carbon which is utilized in formed disks 14 of the stack, and that it has no chemical effect on the composition of the other movable elements within the casing.

The gases helium and hydrogen are especially suited for use in the casing 16 as they are inert with respect to the disks, making it possible to operate the regulator at elevated temperatures without destroying the disks 14. Further, hydrogen and helium, transmit heat at a rate about six times faster than can be obtained if the thermally conducting fluid medium is not present within the casing. As gases are inert with respect to the disks of resistance material, a longer life of the disks can be obtained as the gas prevents frosting or freezing of the disks due to sweating and also prevents deterioration of the disks by excluding oxygen therefrom.

Where a liquid medium is used instead of the inert gaseous medium, it is preferred to employ a permanent liquid dialkyl silicone. Of the known silicones, that silicone liquid which is essentially dimethyl silicone which has been polymerized and is free of mono-methyl silicone groups is preferred. The essentially dimethyl silicones are produced by fractionating a mixture of methyl silicone ethoxides to separate the dimethyl silicone diethoxide as a substantially pure component which is hydrolyzed to the dimethyl silicol and then dehydrated with an agent such as sulphuric acid to dimethyl silicones of predetermined molecular size. By fractionating the oily dimethyl silicones, a stable liquid of predetermined viscosity may be obtained. This process and product are described in greater detail in the copending application of J. G. Ford and J. R. Wenzel, Serial No. 439,066, filed April 15, 1942, and assigned to the assignee of this invention. The dimethyl silicone insulating medium is especially suited for use in the regulator of this invention, as it is especially stable over wide ranges of temperature, very little change in viscosity being encountered over ranges of from —70° F. up to as high as 500° F.

After the fluid medium 118 is admitted to the housing 16, a cap 124 is placed upon the vent 116 and the joint is brazed or soldered as at 126 for effectively sealing the vent. Thus, all the moving elements of the regulator are enveloped in a fluid insulating medium, and the casing is sealed to prevent loss or contamination of the fluid insulating medium.

The diaphragms 84 and 86, associated with the spring members 64 and 66, respectively, are preferably in the form of flat disks which extend across the end sections 22 and 24 and terminate adjacent the side walls of the end sections. When the casing 16 is filled with the fluid insulating medium 118, as described hereinbefore, it is found that the diaphragms 84 and 86 cooperate therewith to effectively damp vibrations of the movable elements within the casing. This is evident when it is considered that the fluid insulating medium 118 envelops the diaphragms 84 and 86 providing a cushion of the fluid medium about both side faces of each of the diaphragms 84 and 86.

The regulator 10, described hereinbefore, is very efficient in operation, it being found that any heat generated in the stack 12 is quickly dissipated, a fluid medium 118 which envelops the stack providing a continuous thermal conducting path from the stack to the fins 114. Since the stack 12 is carried in floating relation between the spring members 64 and 66, it is apparent that the operation is stabilized as the resilient members tend to absorb any vibrations which might be encountered. However, where such vibrations cannot be absorbed by the spring members 64 and 66, then the diaphragms 84 and 86 function to efficiently damp the vibrations.

By utilizing two electromagnets disposed for controlling the pressure applied to the stack, it is apparent that the sensitivity of the regulator is greatly increased for where both electromagnets are energized simultaneously less energizing force is required to obtain the same total pressure change, as in previous regulators where a single electromagnet is employed. Where the change in the energization of the electromagnets is simultaneous, the change in the pressure applied to the stack 12 effects a more uniform change in resistance as the pressure applied to each end of the stack is changed with the result that a more uniform pressure is applied to the stack for a decrease in energization or a more uniform releasing pressure is obtained where the change in the energization of the electromagnets is an increase. The even distribution of the disks 14 of the stack under the change of pressure effects a more even distribution of heat throughout the stack as well as a substantially uniform voltage per disk throughout the length of the stack.

Since the stack of disks 14 are carried in a floating relation in the casing, a longer life of the stack is obtained as any jarring or force applied to the regulator is absorbed in the spring mounting for the floating stack or the vibrations are damped by reason of the diaphragms, thereby preventing cracking or breaking of the individual disks of the stack.

Although this invention has been described with reference to a particular embodiment thereof, it is, of course, not to be limited thereto except in so far as is necessitated by the scope of the appended claims.

I claim as my invention:

1. In a regulator, in combination, a casing, a stack of disks of resistance material disposed within the casing, a spring member associated with each end of the stack, the spring members being disposed under compression to seat within the casing to apply opposite forces to the stack to effect a compression thereof, means carried by the opposed spring members for maintaining the disks of the stack aligned, the spring members cooperating with the casing and stack for applying sufficient pressure to maintain the aligning means and the stack in a floating position within the casing under all operating conditions, the opposed spring members and aligning means carried thereby being the only supporting means for the stack to maintain the stack in said floating position, means associated with each of the spring members operative under predetermined conditions for controlling the pressure applied to the stack by the spring members, and a thermally conducting fluid insulating medium disposed within the casing to envelop the floating members therein.

2. In a regulator, in combination, a casing; a stack of disks of resistance material disposed within the casing, a spring member associated with each end of the stack, the spring members being disposed under compression to seat within the casing to apply opposite forces to the stack to effect a compression thereof, means carried by the opposed spring members for maintaining the disks of the stack aligned, the spring members cooperating with the casing and stack for applying sufficient pressure to maintain the aligning means and the stack in a floating position within the casing, under all operating conditions, the opposed spring members and aligning means carried thereby being the only supporting means for the stack to maintain the stack in said floating position, an electromagnet associated with each of the spring members, each of the electromagnets having an armature member disposed within the casing for movement with the associated spring member, the armature members being disposed to control the pressure applied to the stack by the spring members in response to the energization of the electromagnets, and a thermally conducting fluid insulating medium disposed within the casing to envelop the movable members therein.

3. In a regulator, in combination, a casing, a stack of disks of resistance material disposed within the casing, a spring member associated with each end of the stack, the spring members being disposed under compression within the casing to apply opposite forces to the stack whereby the stack is supported in a floating position within the casing by only the pressure of the opposed spring members, the spring members also effecting a compression of the stack, an electromagnet associated with each of the spring members, each of the electromagnets having an armature member disposed within the casing for movement with the associated spring member, the armature members being disposed to control the pressure applied to the stack by the spring members in response to the energization of the electromagnets, and a thermally conducting fluid insulating medium disposed within the casing to envelop the stack and associated spring and armature members.

4. In a regulator, in combination, a casing, a stack of disks of resistance material disposed within the casing, a spring member associated with each end of the stack, the spring members being disposed under compression to seat within the casing to apply opposite forces to the stack to effect a compression thereof, means carried by the opposed spring members for maintaining the disks of the stack aligned, the spring members cooperating with the casing and stack for applying sufficient pressure to maintain the aligning means and the stack in a floating position within the casing under all operating conditions, the opposed spring members and aligning means carried thereby being the only supporting means for the stack to maintain the stack in said floating position, means associated with each of the spring members operative under predetermined conditions for controlling the pressure applied to the stack by the spring members, a thermally conducting fluid insulating medium disposed within the casing to envelop the floating members therein, and means associated with each of the spring members disposed to cooperate with the fluid insulating medium to damp excessive movement of the movable members other than predetermined movements.

5. In a regulator, in combination, a casing, a stack of disks of resistance material disposed within the casing, a spring member associated with each end of the stack, the spring members being disposed under compression to seat within the casing to apply opposite forces to the stack to effect a compression thereof, means carried by the opposed spring members for maintaining the disks of the stack aligned, the spring members cooperating with the casing and stack for applying sufficient pressure to maintain the aligning means and the stack in a floating position within the casing under all operating conditions, the opposed spring members and aligning means carried thereby being the only supporting means for the stack to maintain the stack in said floating position, means associated with each of the spring members operative under predetermined conditions for controlling the pressure applied to the stack by the spring members, a thermally conducting fluid insulating medium disposed within the casing to envelop the floating members therein, and a diaphragm carried by each of the spring members, the diaphragms having free edges extending outwardly into the fluid insulating medium to cooperate therewith to damp excessive movement of the movable members other than predetermined movements.

6. In a regulator, in combination, a casing, a stack of disks of resistance material disposed within the casing, a spring member associated with each end of the stack, the spring members being disposed under compression to seat within the casing to apply opposite forces to the stack to effect a compression thereof, means carried by the opposed spring members for maintaining the disks of the stack aligned, the spring members cooperating with the casing and stack for applying sufficient pressure to maintain the aligning means and the stack in a floating position within the casing under all operating conditions, the opposed spring members and aligning means carried thereby being the only supporting means for the stack to maintain the stack in said floating position, means associated with each of the spring members operative under predetermined conditions for controlling the pressure applied to the stack by the spring members, a diaphragm associated with each of the spring members disposed to extend substantially perpendicular to the line of the compressive force applied to the stack, the diaphragms having free edges terminating adjacent the casing, and a thermally conducting fluid insulating medium disposed within the casing to envelop the floating members therein, the diaphragms and fluid medium cooperating to damp excessive movement of the movable elements other than predetermined movements.

7. In a regulator, in combination, a casing, a stack of disks of resistance material disposed within the casing, a spring member associated with each end of the stack, the spring members being disposed under compression to seat within the casing to apply opposite forces to the stack to effect a compression thereof, means carried by the opposed spring members for maintaining the disks of the stack aligned, the spring members cooperating with the casing and stack for applying sufficient pressure to maintain the aligning means and the stack in a floating position within the casing under all operating conditions, the opposed spring members and aligning means carried thereby being the only supporting means for the stack to maintain the stack in said floating position, an electromagnet having an armature member associated with each of the spring members, the armature members being disposed within the casing and mechanically coupled to their associated spring members to control the pressure applied to the stack in response to the energization of the electromagnets, and a thermally conducting fluid insulating medium disposed within the casing to envelop the movable members therein.

8. In a regulator, in combination, a casing, a stack of disks of resistance material disposed within the casing, a spring member associated with each end of the stack, the spring members being disposed under compression to seat within the casing to apply opposite forces to the stack to effect a compression thereof, means carried by the opposed spring members for maintaining the disks of the stack aligned, the spring members cooperating with the casing and stack for applying sufficient pressure to maintain the aligning means and the stack in a floating position within the casing under all operating conditions, the opposed spring members and aligning means carried thereby being the only supporting means for the stack to maintain the stack in said floating position, an electromagnet associated with each of the spring members, each of the electromagnets having an armature member disposed within the casing for movement with the associated spring member, the armature members being disposed to control the pressure applied to the stack by the spring members in response to the energization of the electromagnets, a thermally conducting fluid insulating medium disposed within the casing to envelop the movable members therein, and means associated with each of the spring members disposed to cooperate with the fluid insulating medium to damp excessive movement of the movable members other than predetermined movements.

9. In a regulator, in combination, a casing, a stack of disks of resistance material disposed within the casing, a spring member associated with each end of the stack, the spring members being disposed under compression to seat within the casing to apply opposite forces to the stack to effect a compression thereof, means carried by the opposed spring members for maintaining the disks of the stack aligned, the spring members cooperating with the casing and stack for applying sufficient pressure to maintain the aligning means and the stack in a floating position within the casing under all operating conditions, the opposed spring members and aligning means carried thereby being the only supporting means for the stack to maintain the stack in said floating position, an electromagnet associated with each of the spring members, each of the electromagnets having an armature member disposed within the casing for movement with the associated spring member, the armature members being disposed to control the pressure applied to the stack by the spring members in response to the energization of the electromagnets, a thermally conducting fluid insulating medium disposed within the casing to envelop the movable members therein, and a diaphragm carried by each of the spring members, the diaphragms having free edges extending outwardly into the fluid insulating medium to cooperate therewith to damp excessive movement of the movable members other than predetermined movements.

10. In a regulator, in combination, a casing, a stack of disks of resistance material disposed within the casing, a spring member associated with each end of the stack, the spring members being disposed under compression to seat within the casing to apply opposite forces to the stack to effect a compression thereof, means carried by the opposed spring members for maintaining the disks of the stack aligned, the spring members cooperating with the casing and stack for applying sufficient pressure to maintain the aligning means and the stack in a floating position within the casing under all operating conditions, the opposed spring members and aligning means carried thereby being the only supporting means for the stack to maintain the stack in said floating position, an electromagnet having an armature member associated with each of the spring members, the armature members being disposed within the casing and mechanically coupled to their associated spring members to control the pressure applied to the stack in response to the energization of the electromagnets, a thermally conducting fluid insulating medium disposed within the casing to envelop the movable members therein, and means associated with each of the spring members disposed to cooperate with the fluid insulating medium to damp excessive movement of the movable members other than predetermined movements.

11. In a regulator, in combination, a casing, a stack of disks of resistance material disposed within the casing, a spring member associated with each end of the stack, the spring members being disposed under compression to seat within the casing to apply opposite forces to the stack to effect a compressive movement thereof, means carried by the opposed spring members for maintaining the disks of the stack aligned, the spring members cooperating with the casing and stack for applying sufficient pressure to maintain the aligning means and the stack in a floating position within the casing under all operating conditions, the opposed spring members and aligning means carried thereby being the only supporting means for the stack to maintain the stack in said floating position, an electromagnet associated with each of the spring members, each of the electromagnets having an armature member disposed within the casing for movement with the associated spring member, the electromagnets being disposed when energized to effect a simultaneous release of the compressive forces of the spring members on the floating stack whereby a substantially even movement of the disks throughout the length of the floating stack is obtained, and a thermally conducting fluid insulating medium disposed within the casing to envelop the movable members therein.

BASCUM O. AUSTIN.